US007397226B1

(12) United States Patent
Mannama et al.

(10) Patent No.: US 7,397,226 B1
(45) Date of Patent: Jul. 8, 2008

(54) LOW NOISE, LOW POWER, FAST STARTUP, AND LOW DROP-OUT VOLTAGE REGULATOR

(75) Inventors: Vello Mannama, Tallinn (EE); Rein Sabolotny, Tallinn (EE); Viktor Strik, Tallinn (EE); Rein Tiikmaa, Tallinn (EE)

(73) Assignee: National Semiconductor Corporation, Santa Clara, CA (US)

( * ) Notice: Subject to any disclaimer, the term of this patent is extended or adjusted under 35 U.S.C. 154(b) by 44 days.

(21) Appl. No.: 11/035,621

(22) Filed: Jan. 13, 2005

(51) Int. Cl.
*G05F 1/573* (2006.01)
*H04B 1/10* (2006.01)

(52) U.S. Cl. ........................ 323/273; 327/558; 327/538

(58) Field of Classification Search ................. 323/280, 323/274, 281, 273; 327/558, 311, 532, 531, 327/551, 538; 330/303
See application file for complete search history.

(56) References Cited

U.S. PATENT DOCUMENTS

| | | | | |
|---|---|---|---|---|
| 4,855,627 | A * | 8/1989 | Hitomi | 327/552 |
| 4,924,115 | A * | 5/1990 | Yazdy | 326/25 |
| 4,983,905 | A * | 1/1991 | Sano et al. | 323/274 |
| 5,841,270 | A * | 11/1998 | Do et al. | 323/314 |
| 6,114,843 | A * | 9/2000 | Olah | 323/280 |
| 6,127,880 | A * | 10/2000 | Holst et al. | 327/531 |
| 6,188,211 | B1 | 2/2001 | Rincon-Mora et al. | |
| 6,232,757 | B1 * | 5/2001 | Afghahi et al. | 323/314 |
| 6,278,320 | B1 * | 8/2001 | Vu | 327/539 |
| 6,346,851 | B1 * | 2/2002 | Zhang et al. | 327/558 |
| 6,459,246 | B1 | 10/2002 | Roo | |
| 6,459,331 | B1 * | 10/2002 | Takeuchi et al. | 327/554 |
| 6,522,114 | B1 * | 2/2003 | Bakker et al. | 323/282 |
| 6,559,715 | B1 * | 5/2003 | Frake et al. | 327/558 |
| 6,657,481 | B2 * | 12/2003 | Rasmussen et al. | 327/540 |
| 6,677,737 | B2 | 1/2004 | Hamon et al. | |
| 6,703,813 | B1 | 3/2004 | Vladislav et al. | |
| 6,965,223 | B1 * | 11/2005 | MacLean et al. | 323/284 |
| 7,015,680 | B2 * | 3/2006 | Moraveji et al. | 323/274 |
| 7,019,499 | B2 * | 3/2006 | Chiu et al. | 323/279 |

OTHER PUBLICATIONS

Sedra and Smith, Microelectronic Circuits, 1991, Saunders College Publishing, Thrid Edition, p. A-11.*
U.S. Appl. No. 10/636,340, filed Aug. 6, 2003 (copy not attached).

(Continued)

*Primary Examiner*—Jeffrey L. Sterrett
*Assistant Examiner*—Harry Behm
(74) *Attorney, Agent, or Firm*—Darby & Darby PC; John W. Branch

(57) ABSTRACT

A circuit and method for providing voltage regulation that operates with relatively low noise, low power, fast start up and low dropout. The invention includes a constant voltage reference that is coupled to a reference amplifier which amplifies the reference voltage to a selectable level. The output of the reference amplifier is provided to an integrated low pass noise filter which suppresses at least the noise generated by the constant voltage reference and the reference amplifier. The output of the integrated noise filter is provided to the inverting input of an error amplifier, whose non-inverting input is coupled to the output voltage (VOUT). Also, the output of the error amplifier is coupled to a gate of a pass transistor that is coupled between the input voltage (VIN) and the output voltage (VOUT) of the invention.

38 Claims, 4 Drawing Sheets

OTHER PUBLICATIONS

U.S. Appl. No. 10/793,430, filed on Mar. 4, 2004 (copy not attached).

Micro Analog Systems, "MAS9123 80mA LDO Voltage Regulator IC," Sep. 4, 2001.

Micro Analog Systems, "MAS9162 80 mA LDO Voltage Regulator IC," May 13, 2002.

Linear Technology, "LT1761 Series 100mA, Low Noise, LDO Micropower Regulators in SOT-23," 1999.

* cited by examiner

LOW NOISE, LOW POWER, FAST STARTUP, AND LOW DROP-OUT VOLTAGE REGULATOR

FIELD OF THE INVENTION

The present invention relates to voltage regulators and more specifically to a circuit and method for providing low drop-out, fast startup, low noise, very low power regulated voltages.

BACKGROUND

Most electronic devices include a power supply with a regulated voltage. Typically, semiconductor based electronic devices operate at relatively low direct current voltages such as five volts or less. However, much of the electrical energy to power electronic devices is made available at substantially larger voltages. For example, residential electrical power in the United States is nominally rated at 120 volts AC. Also, automotive power is nominally 12 volts DC, which is often subject to relatively high voltage transients during engine start and other changing load conditions.

Power supplies are generally employed to match the requirements of electronic devices to the available conditions of electrical power. Many electronic devices, for example hand held electronics, powered by batteries nominally within the voltage range of the electronics employ power supplies to compensate for non-linear discharge characteristics of batteries and to extract as much energy from the batteries as possible.

A power supply typically includes a voltage regulator to maintain voltage within a range of output values, e.g., five volts plus or minus two percent. If a voltage goes above the range of output values, it may damage the semiconductor device. Similarly, if the voltage goes below the range of output values, voltage compliance can be lost on one or more components of the electronic device, which may cause the device to stop operating. Also, changes in the output voltage of a power supply may induce noise into subsequent processing by other electronic devices and components.

Most voltage regulators include at least one voltage reference. The voltage reference provides a reference voltage that is typically compared against the output of the voltage regulator. Feedback circuitry is employed to adjust (stabilize) the output of the voltage regulator in regard to the reference voltage. Usually, a bandgap circuit is employed as the reference voltage. The term “bandgap” generally describes or refers to the energy difference between the top of the valence band and the bottom of the conduction band in insulators and semiconductors.

To accommodate a voltage regulator that has a plurality of output voltages, the voltage reference is typically based on a minimum bandgap voltage. Typically, the minimum bandgap voltage is 1.25 volts for a voltage regulator that has output values of 1.8 volts, 3.3 volts and 5 volts. Historically, a relatively large power supply rejection ratio is preferred so that a compensation capacitor coupled to the regulator’s output can be sized relatively small both physically and in terms of capacitance. Also, a relatively low quiescent (idle) current and fast startup for the voltage regulator is preferred in many applications such as mobile devices.

Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment or an embodiment combining software and hardware aspects. The following detailed description is, therefore, not to be taken in a limiting sense.

Briefly stated, the present invention is directed to a circuit and method for providing a voltage regulator that operates with relatively low noise, low power, fast start up and low dropout. The inventive integrated circuit comprises a constant voltage reference that is coupled to a reference amplifier which amplifies the reference voltage to a selected level. The output of the reference amplifier is provided to a noise filter which suppresses at least the noise generated by the constant voltage reference and the reference amplifier. The output of the integrated noise filter is provided to the inverting input of an error amplifier whose non-inverting input is coupled to the output voltage (VOUT). Also, the output of the error amplifier is coupled to a gate of a pass transistor that is coupled between an input voltage (VIN) and the output voltage (VOUT) of the invention. Typically, the filter is a low pass filter, however, in other embodiments it may also include other types of filters.

Figure 1:
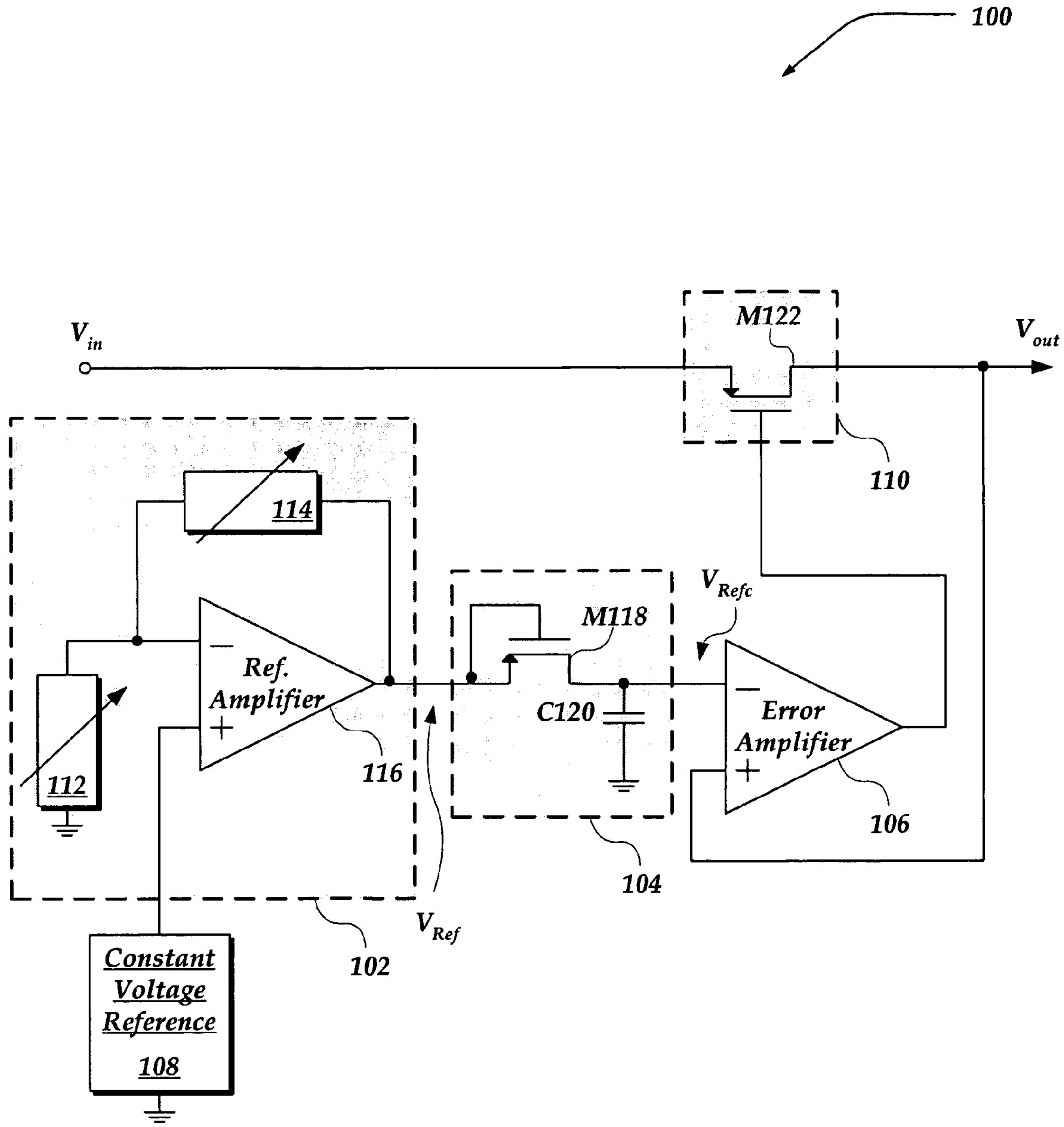
FIG. 1 illustrates a block diagram of an embodiment of a low-dropout (LDO), very low power voltage regulator employing an integrated noise filter.

FIG. 1 is a schematic diagram of an exemplary voltage regulator 100 that is arranged in accordance with the present invention. As shown, constant voltage reference 108 is coupled between ground and the non-inverting input of reference amplifier 116. In one embodiment, constant voltage reference 108 is a band gap voltage reference (typically rated at 1.2 volts) as discussed above. In another embodiment that provides a voltage reference at 1 volt or less, another configuration of components may be employed as constant voltage reference 108. Additionally, in one embodiment, a bias current can be provided at relatively low levels such as 10 s of nano-amperes while consuming relatively low power at the micro-watt level.

The voltage level of the output (Vref) of reference amplifier 116 is selectable through the adjustment of the resistances of impedances 112 and 114. Impedance 114 is coupled between the inverting input and the output of reference amplifier 116, and impedance 112 is coupled between ground and the inverting input of the reference amplifier. Furthermore, by adjusting the resistance values of impedances 112 and 114, reference amplifier 116 can amplify the output of constant voltage reference 108 to a voltage level that can be employed as a reference by error amplifier 106. In one embodiment, impedance 114 is rated at approximately 500K ohms and impedance 112 is rated at 2000K ohms.

The output voltage (Vref) of reference amplifier 116 is provided to an input of integrated noise filter 104 which operates as a very low pass filtering mechanism to substantially suppress noise generated by the operation of constant voltage reference 108 and reference amplifier 116. Noise filter 104 includes an impedance (MOS transistor M118) and capacitor C120. Transistor M118 is arranged with its source coupled to both its gate and the output of reference amplifier 116. The drain of transistor M118 is coupled to one end of capacitor C120 and the inverting input of error amplifier 106. The other end of capacitor C120 is coupled to ground. In one embodiment, capacitor C120 enables a relatively fast startup with a capacitance of approximately a few hundred picofarads. In another embodiment, the value of capacitor C120 might be a few tens of picofarads and the arrangement of the impedance (M118) might provide 40 G ohms of resistance. Also, this arrangement of components enables the low pass filtered reference voltage (VREFC) outputted by filter 104 to be provided to the inverting input of error amplifier 106.

Additionally, pass MOS transistor M122 is arranged with its source coupled to the input voltage VIN, its gate coupled to the output of error amplifier 106 and its drain coupled to the output voltage VOUT for the inventive voltage regulator. This configuration of the error amplifier and the pass MOS transistor forms a voltage follower with minimal noise amplification. This arrangement of components provides a relatively good power supply rejection ratio (PSRR) (based in part on the constant voltage reference 108) which can help compensate for loss of accuracy caused at least in part by integrated noise filter 104. Also, the inventive voltage regulator shown in FIG. 1 provides a relatively constant voltage level for VOUT with relatively low noise, low power, fast start up and low dropout.

Figure 2:
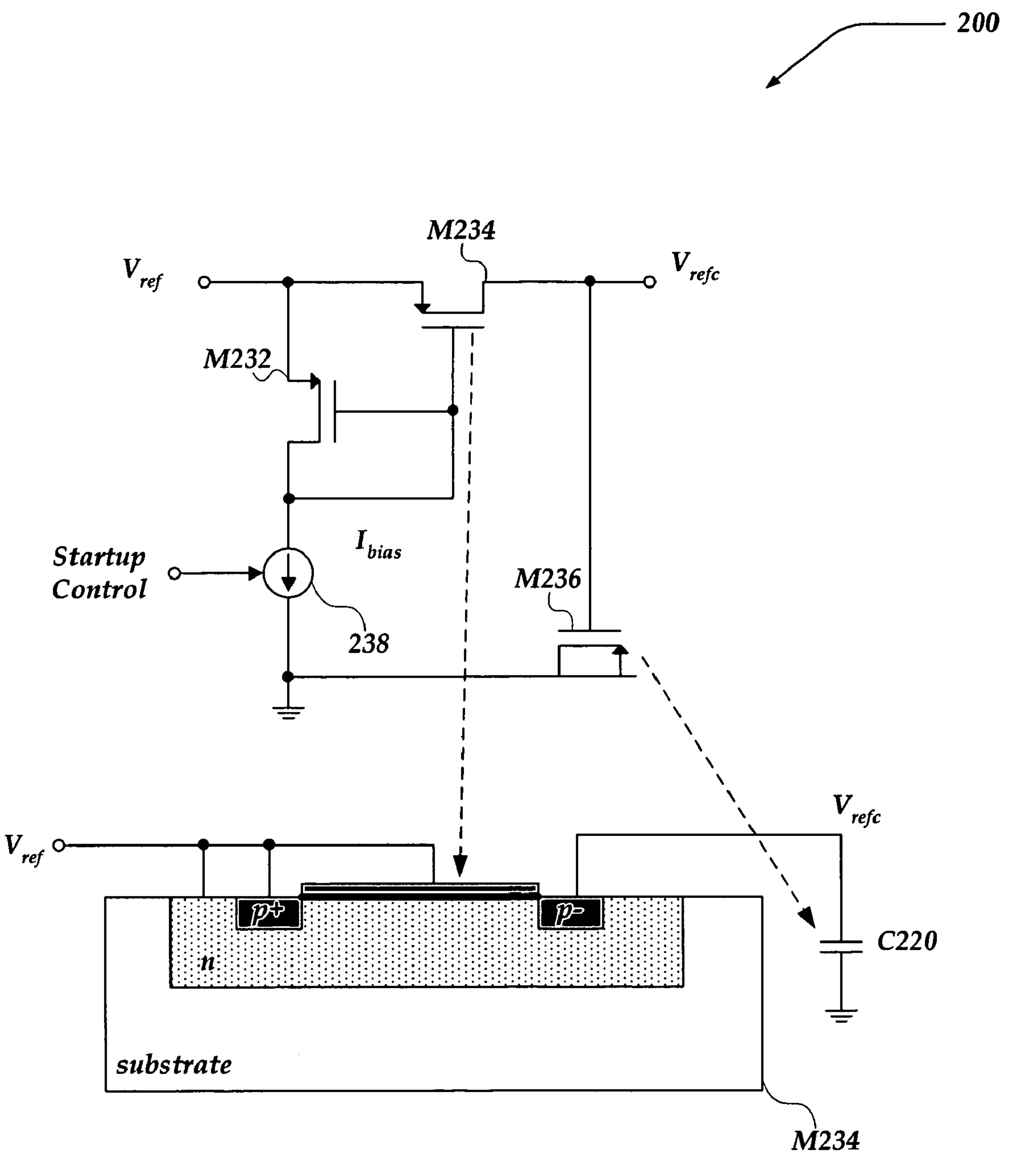
FIG. 2 schematically illustrates an embodiment of the integrated noise filter of FIG. 1.

FIG. 2 illustrates a schematic diagram of integrated noise filter 200 which enables substantially the same low pass operation as filter 104 in regard FIG. 1. The output voltage (VREF) of a reference amplifier (not shown) is provided to the sources of two PMOS transistors M232 and M234. M234 is arranged to operate as a MOS based impedance in a manner substantially similar to M118 in some ways, albeit different in other ways. The gates of PMOS transistors M232 and M234 are tied together at the drain of PMOS transistor M232. Also, adjustable sinking current source 238 is tied between the drain of transistor M232 and ground. In one embodiment to enable a relatively fast startup at relatively low power, current source 238 can sink a bias current of approximately 10-30 nano-amperes. In yet another embodiment, current source 238 can sink a couple of 100 nano-amperes. Also, to ensure the desired characteristics of the exemplary noise filter, the geometry of PMOS transistor M234 can be configured to be narrow and long and the geometry of PMOS transistor M232 can be arranged to be wide and short.

Additionally, PMOS transistor M236 is arranged as a capacitor with its source and drain coupled to ground, and its gate coupled to the drain of PMOS transistor M234 at the output node for the filtered reference voltage (VREFC). Furthermore, FIG. 2 also illustrates the MOS structure for the arrangement of PMOS transistor M234 and the capacitance (M236) for integrated noise filter 200. In this arrangement, there is a relatively zero potential (voltage) between the drain and the N-well for M234 at steady state.

Figure 3:
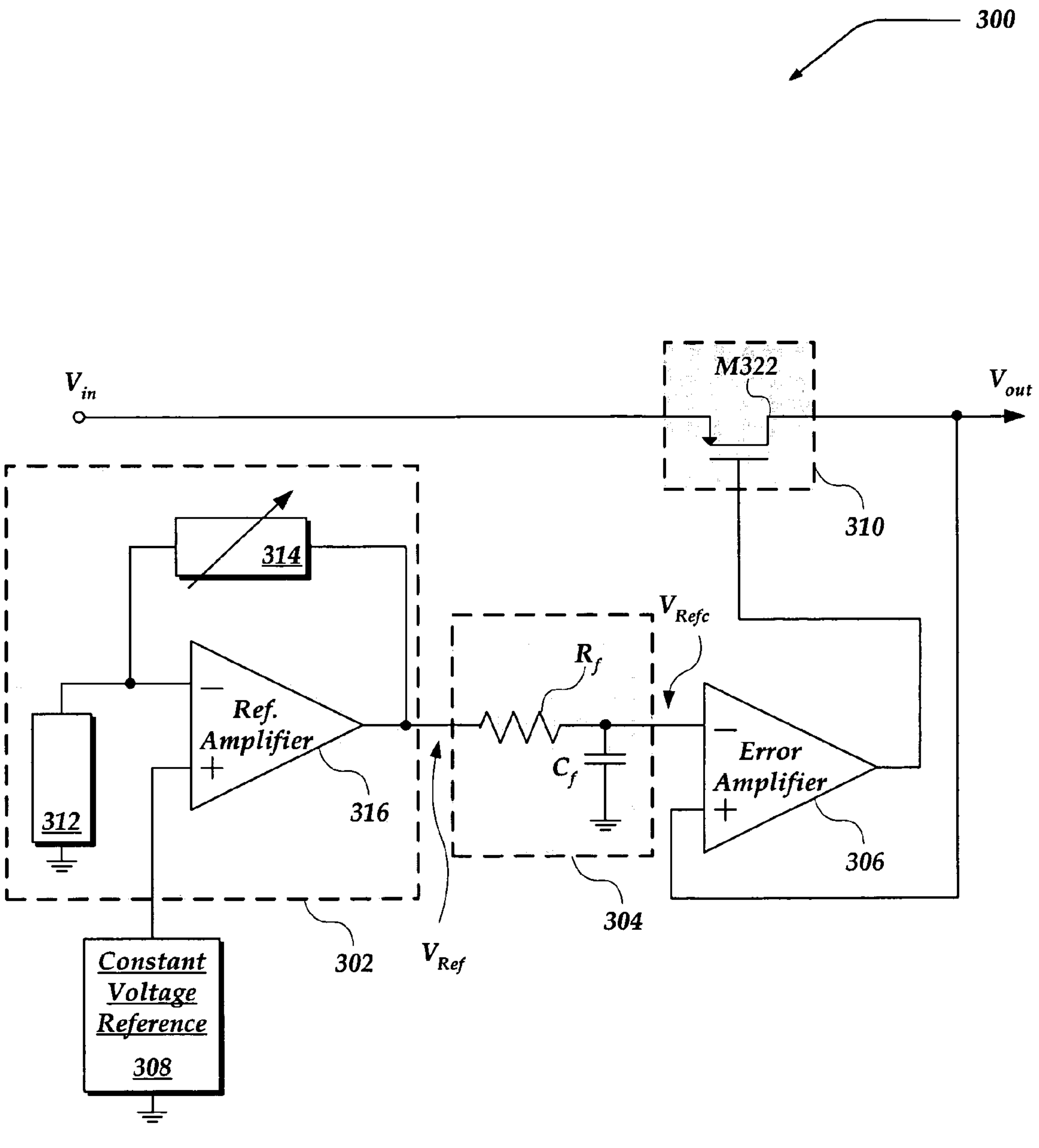
FIG. 3 illustrates a block diagram of another embodiment of a low-dropout (LDO), very low power voltage regulator employing an integrated noise filter.

FIG. 3 illustrates a schematic diagram of an exemplary voltage regulator 300 that is arranged in accordance with the present invention. As shown, regulator 300 operates in a manner substantially similar to regulator 100 in some ways, albeit different in other ways. As shown, the resistance of feedback impedance 314 is adjustable, but the resistance of grounded impedance 312 is fixed. The gain of reference amplifier 316 can be selected by choosing a resistive value for impedance 312 and adjusting the resistance for feedback impedance 314, which are coupled to the inverting input of the reference amplifier. Constant voltage reference 308 is coupled between ground and the non-inverting input of reference amplifier 316 so that a reference voltage VREF (with the selected gain) is outputted by the reference amplifier to the integrated noise filter.

Resistor Rf and capacitor Cf are arranged as a substantially very low pass filter, in part, so that noise generated by constant voltage reference 308 and/or reference amplifier 316 is substantially reduced before it is provided as a filtered reference voltage (VREFC) to the inverting input of error amplifier 306. The non-inverting input of error amplifier 306 is coupled to the output voltage (VOUT) of regulator 300. The error amplifier's output is coupled to the gate of pass PMOS transistor 310, where the pass transistor's source is coupled to the input voltage of regulator 300 (VIN) and whose drain is coupled to VOUT. Furthermore, in part, since the conduction of the pass transistor is controlled by the output of the error amplifier, the VOUT for regulator 300 is maintained at a relatively constant value with low noise, low power, fast startup and low drop out.

Figure 4:
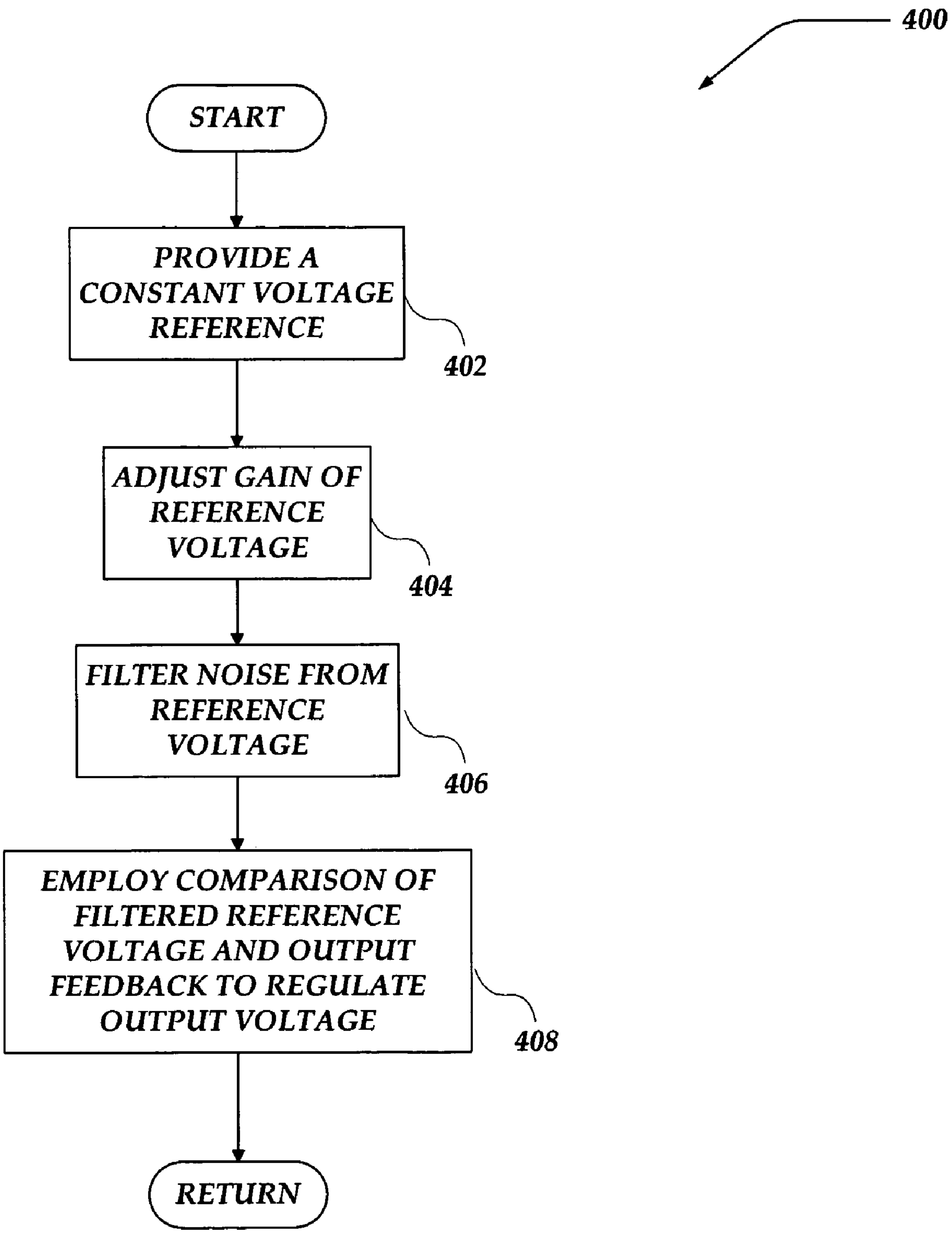
FIG. 4 shows a flow chart in accordance with the present invention.

FIG. 4 illustrates overview 400 of a flow chart for a process that enables an output voltage to be regulated while operating with relatively low noise, low power, fast start up and low dropout. Moving from a start block, the process steps to block 402 where a constant voltage reference is provided such as a reference voltage from a bandgap reference, and the like. At block 404, the gain for the reference voltage is adjusted based at least in part on the constant voltage reference and the desired output voltage (VOUT).

Next, at block 406, noise from the reference voltage is filtered with an integrated circuit that includes other components that provide the gain and the constant voltage reference. Advancing to block 408, the process employs the filtered reference voltage and feedback from the output voltage (VOUT) to regulate VOUT. The process steps to a return block and returns to performing other actions.

The above specification, examples and data provide a description of the manufacture and use of the composition of the invention. Further, it is also understood that any combination of PMOS and NMOS transistors could be arranged for different embodiments of the components of the inventive voltage regulator, which would function in substantially the same manner as discussed above. Since many embodiments of the invention can be made without departing from the spirit and scope of the invention, the invention also resides in the claims hereinafter appended.

We claim:

1. An integrated circuit voltage regulator, comprising:
- a filter including:
  - a capacitive element; and
  - a resistive element, including:
    - a resistive transistor including:
      - a source;
      - a drain; and
      - a well; and
    - a second transistor, wherein a length of the resistive transistor is substantially greater than a width of the resistive transistor, and wherein a width of the second transistor is substantially greater than a length of the second transistor;

a reference amplifier having at least an input and an output, wherein the input of the reference amplifier is arranged to receive a constant voltage reference, and wherein the output of the reference amplifier is coupled to the source and the well of the resistive transistor of the filter;

an error amplifier having at least an input and an output, wherein the input of the error amplifier is coupled to the filter, and wherein the source and the drain of the resistive transistor of the filter are arranged to provide a resistive channel between the reference amplifier and the error amplifier; and a pass transistor that is coupled to an input node and to the output of the error amplifier.

2. The regulator of claim 1, wherein the filter includes at least one of a low pass filter or another filter.

3. The regulator of claim 1, wherein the constant voltage reference is a bandgap reference.

4. The regulator of claim 3, wherein the bandgap reference is coupled to the input of the reference amplifier, wherein the bandgap reference is operable to provide a reference voltage to the input of the reference amplifier, the reference amplifier is operable to provide a reference voltage at the output of the reference amplifier such that the reference voltage is approximately equal to the bandgap voltage times a gain value of the reference amplifier, and wherein the reference amplifier circuit is arranged such that the gain of the reference amplifier is adjustable to select the output voltage.

5. The regulator of claim 1, wherein the reference amplifier further comprises at least one adjustable component, wherein the one adjustable component enables a gain for the reference amplifier to be selectable.

6. The regulator of claim 1, wherein the error amplifier and the pass transistor are arranged to provide substantially unity gain for the filtered reference voltage.

7. The regulator of claim 1, wherein at least one of the pass transistor or the filter are based on at least one of PMOS or NMOS transistors.

8. The regulator of claim 1, wherein the filter is coupled to a bias current source.

9. The regulator of claim 1, further comprising a bias current source that provides a controllable bias current for enabling relatively fast start-up.

10. The regulator of claim 1, wherein the pass transistor is arranged to provide a relatively low drop out mode of operation.

11. The regulator of claim 1, wherein the filter is coupled to a current source that enables a relatively fast startup with a relatively low quiescent bias current and relatively low power.

12. The regulator of claim 1, wherein the resistive transistor includes:

a gate;

a n-type well;

a p-type source region in the n-type well, wherein the source region of the resistive transistor is connected to the n-type well of the resistive transistor, and further connected to a source of the second transistor; and a p-type drain region in the n-type well, wherein the drain region of the resistive transistor is connected to the capacitive element.

13. The regulator of claim 1, wherein the filter further includes:

a current sink that is coupled to a drain of the second transistor.

14. The regulator of claim 13, wherein the current sink is operable to sink a bias current of no more than approximately 100 nano-Amperes.

15. The regulator of claim 1, wherein the constant voltage reference is provided by a bandgap reference, and wherein the bandgap reference has an output that is coupled to the input of the reference amplifier circuit, wherein the reference amplifier includes:

an op amp having at least a first input, a second input, and an output, wherein the first input of the op amp is coupled to the output of the bandgap reference, and wherein the output of the op amp is coupled to the p-type source region of the resistive transistor; and a second resistive element having a variable resistance, wherein the second resistive element is coupled between the second input of the op amp and the output of the op amp.

16. The regulator of claim 1, further comprising:

a bias current source, wherein the bias current source is coupled to a drain of the second transistor, and wherein the resistive transistor includes:

a gate;

a n-type well;

a p-type source region in the n-type well, wherein the source region of the resistive transistor is connected to: the n-type well, the source of the resistive transistor, and to the output of the reference voltage amplifier;

a p-type drain region in the n-type well of the resistive transistor, wherein the drain region of the resistive transistor is coupled to the capacitive element.

17. The regulator of claim 16, wherein the resistive transistor is biased such that there is an approximately zero potential between the n-type well of the resistive transistor and the p-type drain region of the resistive transistor at a steady-state condition.

18. The regulator of claim 16, wherein the bias current source is operable to sink a bias current of no more than approximately 50 nano-Amperes.

19. The regulator of claim 16, wherein the pass transistor has at least a gate, a drain, and a source, wherein the source of the pass transistor is coupled to an input voltage node, and wherein the drain of the pass transistor is coupled to an output voltage node; and the error amplifier has at least a first input, a second input, and an output, wherein the first input of the error amplifier is coupled to the drain region of the resistive transistor, the second input of the error amplifier is coupled to the output voltage node, the output of the error amplifier is coupled to a gate of the pass transistor.

20. The regulator of claim 1, wherein the resistive transistor of the resistive element of the filter further includes a drain region, and wherein the resistive transistor is biased such that there is an approximately zero potential between the well of the resistive transistor and the drain region of the resistive transistor at a steady-state condition.

21. The regulator of claim 1, wherein the pass transistor has at least a gate, a drain, and a source, wherein the source of the pass transistor is coupled to an input voltage node, and wherein the drain of the pass transistor is coupled to an output voltage node; and the error amplifier has at least a first input, a second input, and an output, wherein the first input of the error amplifier is coupled to the drain region of the resistive transistor, the second input of the error amplifier is coupled to the output voltage node, the output of the error amplifier is coupled to the gate of the pass transistor.

22. The regulator of claim 1, wherein the resistive transistor of the resistive element of the filter further includes a source region that is in the well and a drain region that is in the well, wherein the source region of the resistive transistor is coupled to the well and to the output of the reference amplifier, and wherein the drain region of the resistive transistor is coupled to the capacitive element.

23. The regulator of claim 1, wherein the well is an n-type well.

24. An integrated circuit voltage regulator, comprising:

a filter;

a reference amplifier that is coupled between a constant voltage reference and the filter, wherein a gain of the reference amplifier is adjustable to provide a reference voltage that is relatively equivalent to an output voltage of the integrated circuit voltage regulator;

an error amplifier that compares a filtered reference voltage outputted by the filter to the output voltage for the integrated circuit voltage regulator; and a pass transistor that is coupled between an input voltage to the integrated circuit voltage regulator and the output voltage, wherein an output of the error amplifier is based on a comparison of the filtered reference voltage and the output voltage, and controls a conduction of the pass transistor, and wherein the controlling of the pass transistor's conduction maintains a substantially constant value for the output voltage with relatively low noise, wherein the filter includes:

a capacitive element; and a resistive element, including:

a first field effect transistor having at least a source, wherein a length of the first field effect transistor is substantially greater than a width of the first field effect transistor, and wherein the reference amplifier is coupled to the filter at the source of the first field effect transistor; and a second field effect transistor, wherein a width of the second field effect transistor is substantially greater than a length of the second field effect transistor.

25. A method for regulating an output voltage, comprising providing a constant voltage reference;

employing a reference amplifier to provide a reference voltage that is based at least in part on the constant voltage reference;

filtering noise from the reference voltage with a filter that is part of an integrated circuit with other components that provide a gain and the constant voltage reference;

employing an error amplifier to perform a comparison of the filtered reference voltage and output voltage feedback to maintain a relatively constant output voltage of a pass transistor, wherein the filter includes a capacitive element, and a resistive transistor having a source, a drain, and a well, wherein the source is coupled to the well, and wherein the source and the drain are arranged to provide a resistive channel, wherein a length of the resistive transistor is substantially greater than a width of the resistive transistor, wherein the filter further includes a second transistor, and wherein a width of the second transistor is substantially greater than a length of the second transistor; and employing the reference voltage to drive the well of the resistive transistor.

26. The method of claim 25, wherein the filtering includes at least one of low pass filtering or other filtering.

27. The method of claim 25, wherein providing the constant voltage reference includes enabling a voltage reference to be provided by a bandgap reference.

28. The method of claim 25, wherein the gain is selectable.

29. The method of claim 25, comprising relatively low noise, low power consumption, fast start-up, and low dropout for regulating the output voltage.

30. An integrated circuit voltage regulator, comprising:

a constant voltage reference;

a reference amplifier that generates a reference voltage, wherein the reference voltage is an amplification of the constant voltage reference, and wherein a gain of the reference amplifier is adjustable to provide the reference voltage at a level that is relatively equivalent to an output voltage of the integrated circuit voltage regulator;

a filter that suppresses noise and provides a filtered reference voltage based at least in part on the reference voltage, wherein the noise is substantially generated by the reference amplifier and the constant voltage reference, wherein the filter includes:

a capacitive element; and a resistive element, including:

a resistive transistor having at least a source that is arranged to receive the reference voltage from the reference amplifier, wherein a length of the resistive transistor is substantially greater than a width of the resistive transistor; and a second transistor, wherein a width of the second transistor is substantially greater than a length of the second transistor;

an error amplifier that makes a comparison between the filtered reference voltage that is outputted by the filter and output voltage feedback from the integrated circuit voltage regulator; and a pass transistor that is coupled between an input voltage to the integrated circuit voltage regulator and the output voltage, wherein a conduction of the pass transistor is controlled by an output of the error amplifier to maintain a substantially constant value for the output voltage, and wherein the constant voltage reference, the reference amplifier, the filter, the error amplifier and the pass transistor are included in the integrated circuit voltage regulator.

31. The regulator of claim 30, wherein the filter includes at least one of a low pass filter or another filter.

32. The regulator of claim 30, wherein the constant voltage reference is a bandgap reference, and wherein the bandgap reference enables, at least in part, a relatively low drop out.

33. The regulator of claim 30, wherein the reference amplifier further comprises at least one adjustable component, wherein the one adjustable component enables the gain for the reference amplifier to be selectable.

34. A low noise micro power regulator controller, comprising:

a reference voltage amplifier having at least an input and an output;

an on-chip low-pass filter, including:

a capacitive element; and a resistive element, including:

a first transistor, wherein a length of the first transistor is substantially greater than a width of the first transistor;

a second transistor, wherein a width of the second transistor is substantially greater than a width of the second transistor, and wherein the second transistor includes:

a gate;

a n-type well;

a p-type source region in the n-type well, wherein the source region of the second transistor is connected to: the n-type well, the source of the second transistor, and to the output of the reference voltage amplifier;

a p-type drain region in the n-type well of the second transistor, wherein the drain region of the second transistor is coupled to the MOS capacitor; and a current sink that is coupled to a drain of the first transistor;

a pass transistor having at least a gate, a drain, and a source, wherein the source of the pass transistor is coupled to an input voltage node, and wherein the drain of the pass transistor is coupled to an output voltage node; and an error amplifier having at least a first input, a second input, and an output, wherein the first input of the error amplifier is coupled to the drain region of the second transistor, the second input of the error amplifier is coupled to the output voltage node, the output of the error amplifier is coupled to the gate of the pass transistor, and wherein the error amplifier has a gain of approximately one.

35. The regulator controller of claim 34, wherein the second transistor is biased such that there is an approximately zero potential between the n-type well of the second transistor and the p-type drain region of the second transistor at a steady-state condition.

36. The regulator controller of claim 34, wherein the current sink is operable to sink a bias current of no more than approximately 50 nano-Amperes.

37. The regulator controller of claim 34, further comprising a bandgap reference that is coupled to the input of the reference voltage amplifier, wherein the bandgap reference is operable to provide a reference voltage to the input of the reference voltage amplifier, the reference voltage amplifier is operable to provide a reference voltage at the output of the voltage reference amplifier such that the reference voltage is approximately equal to the bandgap voltage times a gain value of voltage reference amplifier, and wherein the reference voltage amplifier circuit is arranged such that the gain of the reference voltage amplifier is adjustable based on a determined regulated output voltage.

38. The regulator controller of claim 34, further comprising a bandgap reference having an output that is coupled to the input of the reference voltage amplifier circuit, wherein the reference voltage amplifier includes:

an op amp having at least a first input, a second input, and an output, wherein the first input of the op amp is coupled to the output of the bandgap reference, and wherein the output of the op amp is coupled to the p-type source region of the second transistor; and a second resistive element having a variable resistance, wherein the second resistive element is coupled between the second input of the op amp and the output of the op amp.

* * * * *